United States Patent
Lai et al.

(10) Patent No.: US 11,929,770 B1
(45) Date of Patent: Mar. 12, 2024

(54) AUTOMATIC GAIN CONTROL (AGC) FOR ON-OFF SHIFT-KEYING (OOK) RECEIVER

(71) Applicant: Hong Kong Applied Science and Technology Research Institute Company Limited, Hong Kong (HK)

(72) Inventors: Yat Tung Lai, Hong Kong (HK); Lu Chen, Hong Kong (HK); Wuxue Ni, Shenzhen (CN); Huimin Guo, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/118,118

(22) Filed: Mar. 6, 2023

(51) Int. Cl.
*H04B 1/04* (2006.01)
*H04B 1/7176* (2011.01)

(52) U.S. Cl.
CPC ............. *H04B 1/04* (2013.01); *H04B 1/7176* (2013.01); *H04B 2001/0416* (2013.01)

(58) Field of Classification Search
CPC .. H03G 3/3068; H03G 3/3052; H03G 3/3036; H03G 3/3078; H03G 1/0029; H03G 3/001; H03G 3/30; H03G 3/3089; H03G 2201/103; H03G 2201/106; H03G 2201/307; H03G 1/0088; H03G 2201/206; H03G 3/20; H03G 1/0023; H03G 1/007; H03G 2201/202; H03G 3/00; H03F 2200/294; H03F 2200/331; H03F 2200/372; H03F 3/195; H03F 3/24; H03F 3/45188; H03F 1/34; H03F 2200/513;
(Continued)

(56) References Cited

U.S. PATENT DOCUMENTS

| 5,936,462 A | 8/1999 | Muraishi |
| 7,565,124 B2 | 7/2009 | Lee et al. |

(Continued)

FOREIGN PATENT DOCUMENTS

| CN | 103580704 B | 5/2015 |
| CN | 113992171 A | 1/2022 |

(Continued)

OTHER PUBLICATIONS

ISR and Written Opinion, PCT/CN2023/080630, dated Nov. 22, 2023.

*Primary Examiner* — Golam Sorowar
(74) *Attorney, Agent, or Firm* — Stuart Auvinen; gPatent LLC

(57) ABSTRACT

An On-Off Shift Keying (OOK) receiver has non-continuous Automatic Gain Control (AGC) that sets gain at the beginning of each frame and locks the gain setting for the remainder of the frame, preventing OOK data from causing AGC loop instability. An AGC controller initializes to maximum the gain settings for a Low-Noise Amplifier (LNA), Low-Pass Filter (LPF), and a Programmable Gain Amplifier (PGA) in series that power a rectifier generating a voltage output to a 1/0 data decision circuit. A level detector compares the voltage output to two thresholds. When both thresholds are exceeded, the AGC controller steps down gain settings until the voltage output is between the two thresholds, when the gain settings are locked for the remainder of the current frame. A frame detector resets the AGC controller between frames when a long series of 0 data between frames is detected. LNA gain is reduced last.

11 Claims, 8 Drawing Sheets

(58) Field of Classification Search
CPC ....... H03F 2203/45644; H03F 3/45192; H03F 2200/451; H03F 3/45197; H03F 1/3211; H03F 3/19; H03F 3/189; H03F 3/21; H03F 3/45475; H03F 2200/211; H04B 17/318; H04B 1/30; H04B 1/16; H04B 2001/0433; H04B 1/109; H04B 1/1027; H04B 1/1018; H04B 1/1036; H04B 1/123; H04B 1/18; H04B 1/40; H04B 1/406; H04B 17/345; H04B 1/0007; H04B 1/0003; H04B 1/001; H04B 1/0014; H04B 1/0046; H04B 1/06; H04B 1/26

See application file for complete search history.

(56) References Cited

U.S. PATENT DOCUMENTS

| | | | |
|---|---|---|---|
| 7,890,075 | B2 | 2/2011 | Xin et al. |
| 8,774,744 | B2 | 7/2014 | Tsou et al. |
| 10,523,251 | B1 * | 12/2019 | Coban .................. H04B 17/318 |
| 2009/0117868 | A1 | 5/2009 | Exeter |
| 2010/0080327 | A1 | 4/2010 | Zhang et al. |
| 2018/0351592 | A1 * | 12/2018 | Coban .................. H03G 3/3078 |
| 2019/0068153 | A1 * | 2/2019 | Arslan ...................... H03F 3/19 |
| 2020/0021374 | A1 * | 1/2020 | de Ruijter ........... H04L 63/1466 |
| 2022/0352861 | A1 | 11/2022 | Gorday et al. |

FOREIGN PATENT DOCUMENTS

| | | | |
|---|---|---|---|
| EP | 1672786 | A | 6/2006 |
| EP | 3657672 | A | 5/2020 |

\* cited by examiner

AUTOMATIC GAIN CONTROL (AGC) FOR ON-OFF SHIFT-KEYING (OOK) RECEIVER

FIELD OF THE INVENTION

This invention relates to Automatic Gain Control (AGC) circuits, and more particularly to non-continuous AGC before framed On-Off Shift Keying (OOK) data.

BACKGROUND OF THE INVENTION

Data is often transmitted using Amplitude-Shift Keying (ASK) modulation. A simplified form of ASK modulation is On-Off Shift Keying (OOK) modulation. A large-amplitude carrier is transmitted to signal a 1, while no carrier is transmitted to signal a 0 when using OOK.

OOK transceivers are particularly useful for battery-powered portable devices because the transmit power is saved when sending 0 data. Since the carrier is only transmitted during data 1 periods, power consumption can be cut by half or more, depending on the data transmitted. OOK is commonly used for short-range wireless communication links.

Automatic Gain Control (AGC) is often used for OOK transceivers. AGC allows for a wide range of input power that would otherwise saturate the receiver.

FIGS. 1A-1B highlight the saturation problem with OOK receivers. In FIG. 1A, a high-amplitude carrier wave is transmitted during data 1 times, while no carrier is transmitted during data 0 times. Low-amplitude oscillations can occur during these data 0 time periods.

The received signal is often very weak, such as when the received signal is a Radio-Frequency (RF) signal received from a small antenna. This weak RF received signal is typically amplified by the receiver. FIG. 1B shows an amplified received signal with saturation. The amplifier gain can be large enough that the high-amplitude signal during the data 1 periods exceeds the range of the physical components or power-supply voltages of the amplifier. The peaks of the received signal are clipped when saturation occurs. Both positive and negative peaks can be clipped.

Although no carrier is transmitted during the 0 data periods, there can still be noise that is received during theses periods, and this noise is amplified by the receiver. Thus the amplified signal during the data 0 periods is larger than the RF input signal from the antenna. The amplitude of the data 0 periods can approach the amplitude during the data 1 periods when saturation occurs and cuts off the peaks during the data 1 periods. It can be difficult to distinguish data 1 and data 0 periods when such saturation occurs.

In portable communication systems, the distance between the transmitter and the receiver's antenna may vary, as can the transmit power and other factors that affect the strength of the received signal. There may be a wide range of input power from the antenna, depending on these factors that can vary. Such a wide range of input power of the received signal can cause saturation due to the limited range of the receiver amplifier and the need for high gain over a wide range of conditions.

FIG. 2 highlights a problem with continuous-time AGC in OOK transceivers. The amplified received signal RIN has a gain set to avoided saturation. This gain can be adjusted using an Automatic Gain Control (AGC) circuit that operates continuously on the input to adjust the gain. The received signal RIN can be rectified and then input to the AGC as signal AGC_IN. During the high-amplitude data 1 periods, AGC_IN quickly drops lower with the first high-amplitude peak, and continues to drift lower as additional high-amplitude peaks are received during the data 1 periods. When the data switches from 1 to 0, the low-amplitude peaks cause AGC_IN to quickly increase, and then to drift high as additional low-amplitude peaks occur during the data 0 periods.

AGC_IN continuously falls during the data 1 periods, and rises during the data 0 periods, essentially oscillating with the OOK data period. This oscillation can cause instability in the AGC loop when the output envelope is not stable. The rectifier output, AGC_IN, can cause the AGC circuit to also oscillate due to the oscillation of its input. This oscillation and instability are undesirable.

What is desired is an OOK receiver with a non-continuous Automatic Gain Control (AGC) circuit. An OOK receiver that adjusts gain before a data payload in a frame is desired. An OOK receiver that performs gain adjustment in a frame header before the frame's data is desirable to prevent oscillation and loop instability when OOK modulation is used.

DETAILED DESCRIPTION

The present invention relates to an improvement in non-continuous AGC circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
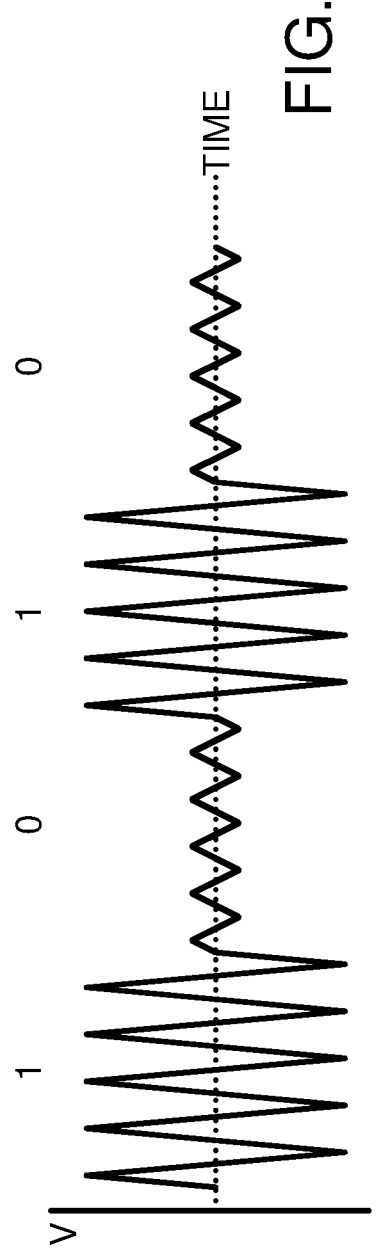
FIGS. 1A-1B highlight the saturation problem with OOK receivers.
Figure 1B:
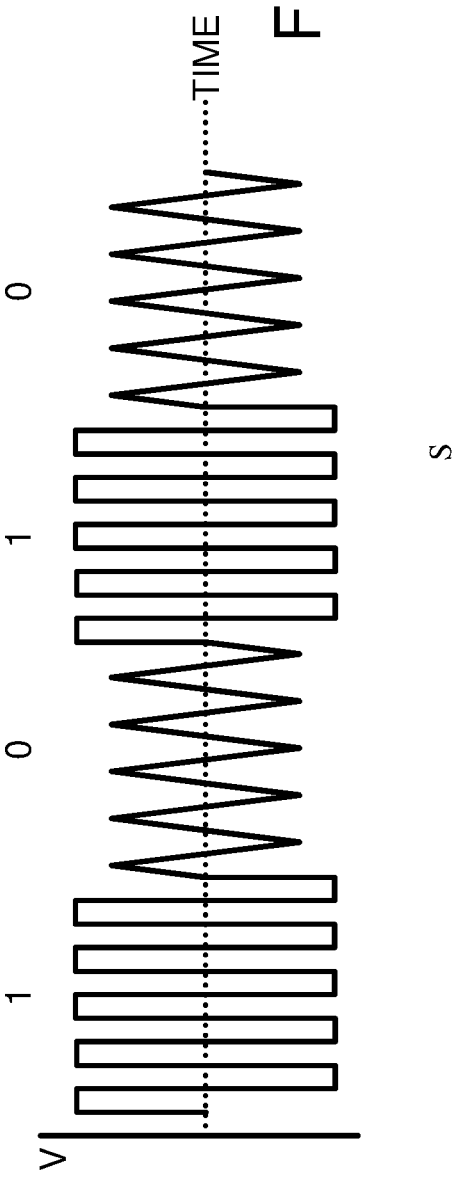
Figure 2:
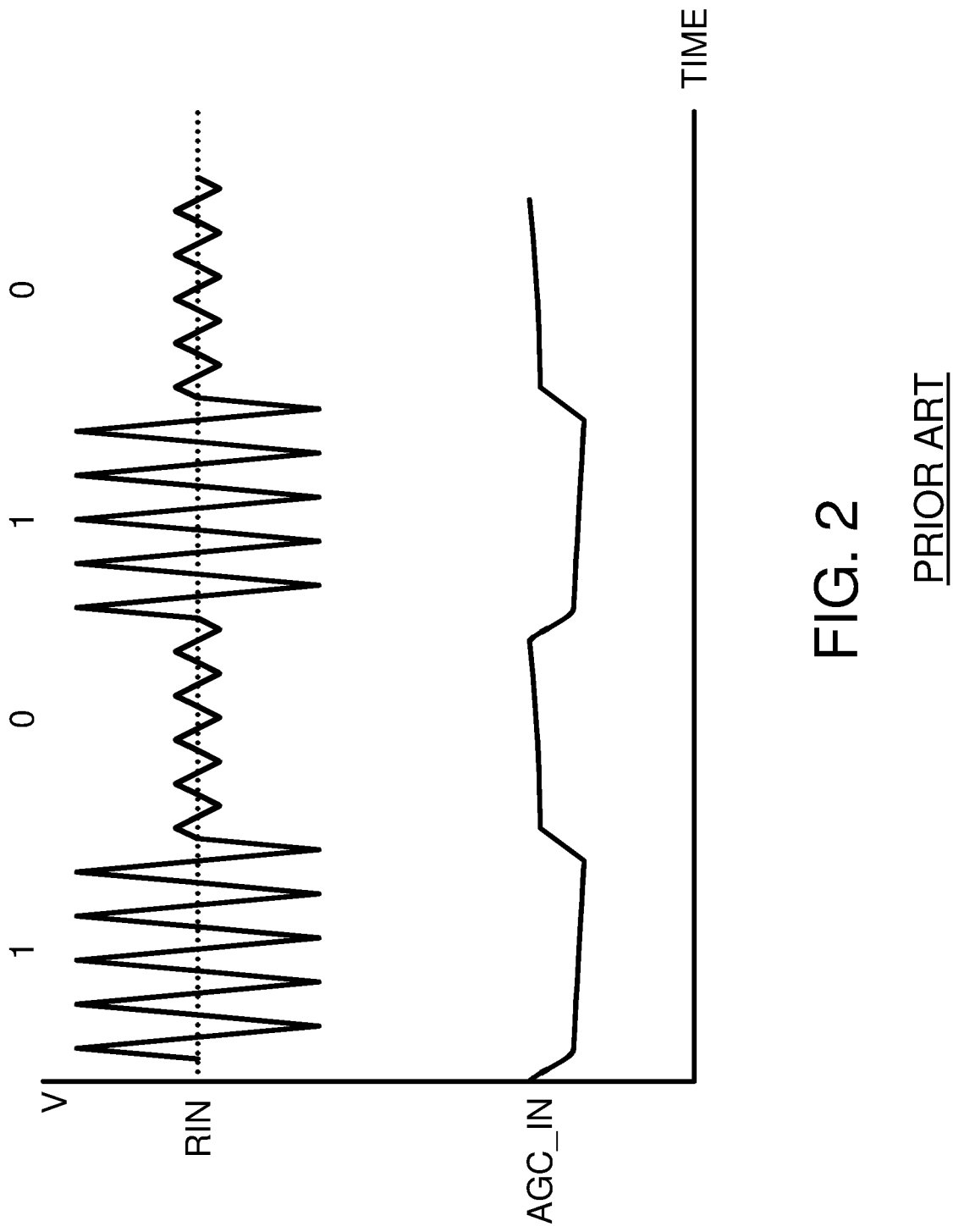
FIG. 2 highlights a problem with continuous-time AGC in OOK transceivers.
Figure 3:
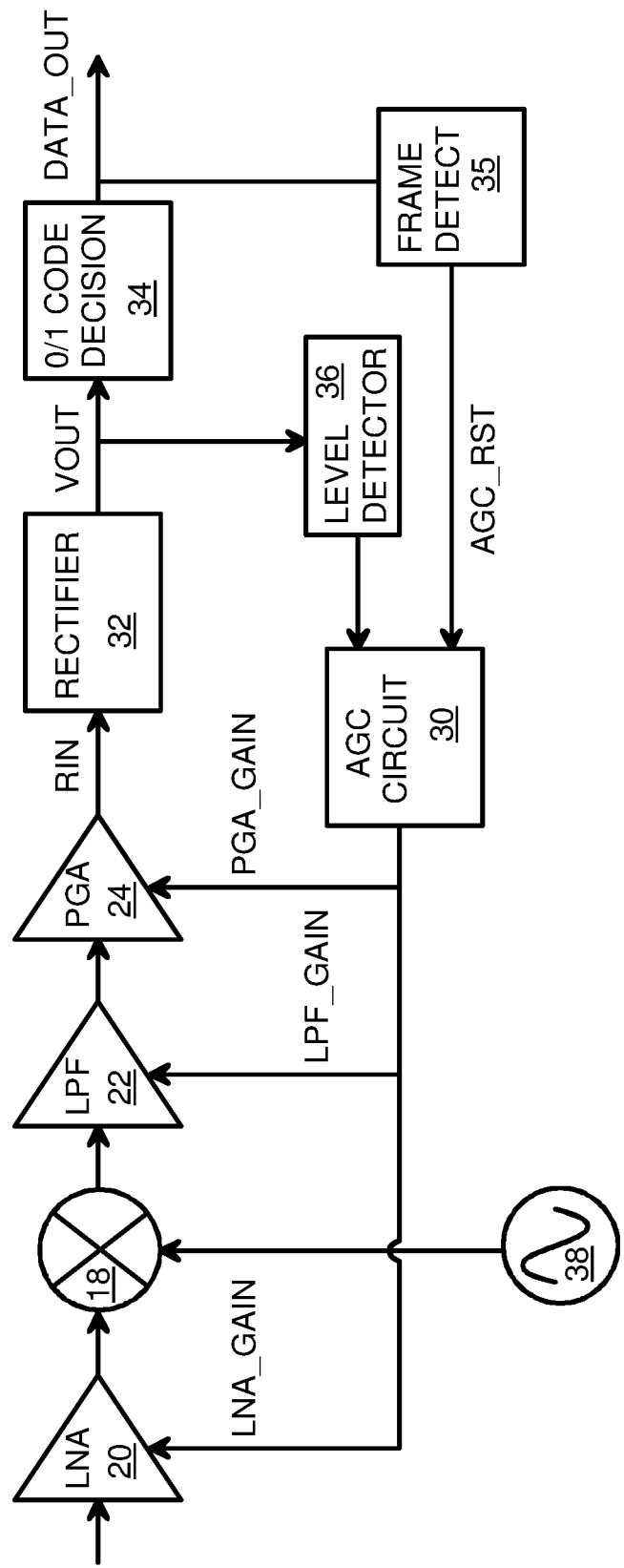
FIG. 3 is a block diagram of an OOK receiver with frame-triggered AGC.

FIG. 3 is a block diagram of an OOK receiver with frame-triggered AGC. An input signal, such as a Radio-Frequency (RF) signal received from an antenna, is input to Low-Noise Amplifier (LNA) 20. LNA 20 has a gain that is adjustable using LNA_GAIN. LNA 20 is designed to amplify a weak signal without adding significant noise to the amplified signal to prevent signal distortion when strengthening the weak input signal.

The output of LNA 20 is applied to mixer 18, which also receives a waveform signal from local oscillator 38, which typically oscillates at a lower frequency than the RF input. Thus mixer 18 translates the RF input to a lower frequency. The RF components are removed by low pass filter 22 and the remaining lower-frequency signal is applied to Programmable Gain Amplifier (PGA) 24. Low pass filter 22 can include an amplifier to improve noise rejection that has a gain that is set by LPF_GAIN. The gain of PGA 24 is set by PGA_GAIN. The amplified output of PGA 24 is the rectifier input, RIN.

Rectifier 32 takes its full-wave RIN input and rectifies it to generate a rectified signal VOUT. This voltage VOUT is applied to decision circuit 34 which compares VOUT to a voltage threshold to determine when a binary 0 or a binary 1 is output as the received data. The resulting output data, DATA_OUT, can be sent to other blocks, such as to parse the data stream for fields within a frame, to save data within a data payload, or to perform Cyclical Redundancy Checking (CRC) to verify the data.

Frame detector 35 examines DATA_OUT to detect frames. For example, frames may be separated by a long sequence of data 0 wherein no carrier is sent for OOK modulation. The start of an OOK frame may have a long sequence of all 1's, when the carrier is continuously sent. Frame detector 35 can detect the long sequence of 0's at the end of a frame, and then activate a frame start signal when the first 1 is detected after the long 0 sequence between frames. Frame detector 35 can also activate a reset signal, AGC_RST, when a long string of 0's is detected at the end of a frame.

Level detector 36 compares the voltage output from rectifier 32, VOUT, to one or more voltage thresholds. Voltage comparison results from level detector 36 are input to AGC controller 30.

AGC controller 30 can be a controller, microcontroller, state machine, programmable logic, or other logic that performs the gain-adjustment routine, such as shown later in FIG. 7. When frame detector 35 signals AGC_RST at the end a frame, AGC controller 30 is reset and activated to perform gain adjustment for the next new frame. When the next new frame starts with a sequence of all 1's, AGC controller 30 reads the voltage compare results from level detector 36 and reduces the gain from a maximum until VOUT is between two voltage levels that are compared by level detector 36.

Once the gain has been set for the new frame, AGC controller 30 locks the gain setting and becomes idle for the remainder of the frame. When the frame ends, frame detector 35 detects the long sequence of 0's between frames and activates AGC_RST to reset AGC controller 30 and trigger AGC controller 30 to activate when the next frame starts with a series of 1's.

After determining the gain setting at the start of each frame, AGC controller 30 remains idle and does not further adjust the gain for the rest of the frame. In particular, the gain is not adjusted during the OOK data payload or other fields in the OOK frame. Since AGC controller 30 is disabled during most of the OOK frame, the AGC loop is broken during OOK data, preventing loop instability and oscillation that could occur if AGC controller 30 were continuously enabled for OOK data.

AGC controller 30 adjusts three different gains: LNA_GAIN to LNA 20, LPF_GAIN to low pass filter 22, and PGA_GAIN to PGA 24. Initially, at the start of a new frame, all three gains, LNA_GAIN, LPF_GAIN, and PGA_GAIN, are set to their maximum values. Rather than decrease all three gains at the same time, AGC controller 30 first decreases PGA_GAIN, then once PGA_GAIN has reached is minimum, AGC controller 30 then decreases LPF_GAIN, and if LPF_GAIN also reaches its minimum before VOUT is between the two voltage thresholds, then finally AGC controller 30 reduces LNA_GAIN. This sequence allows for LNA 20 to operate at its maximum gain as much as possible, helping to amplify the weak RF input signal as much as possible while achieving good noise rejection.

Figure 4:
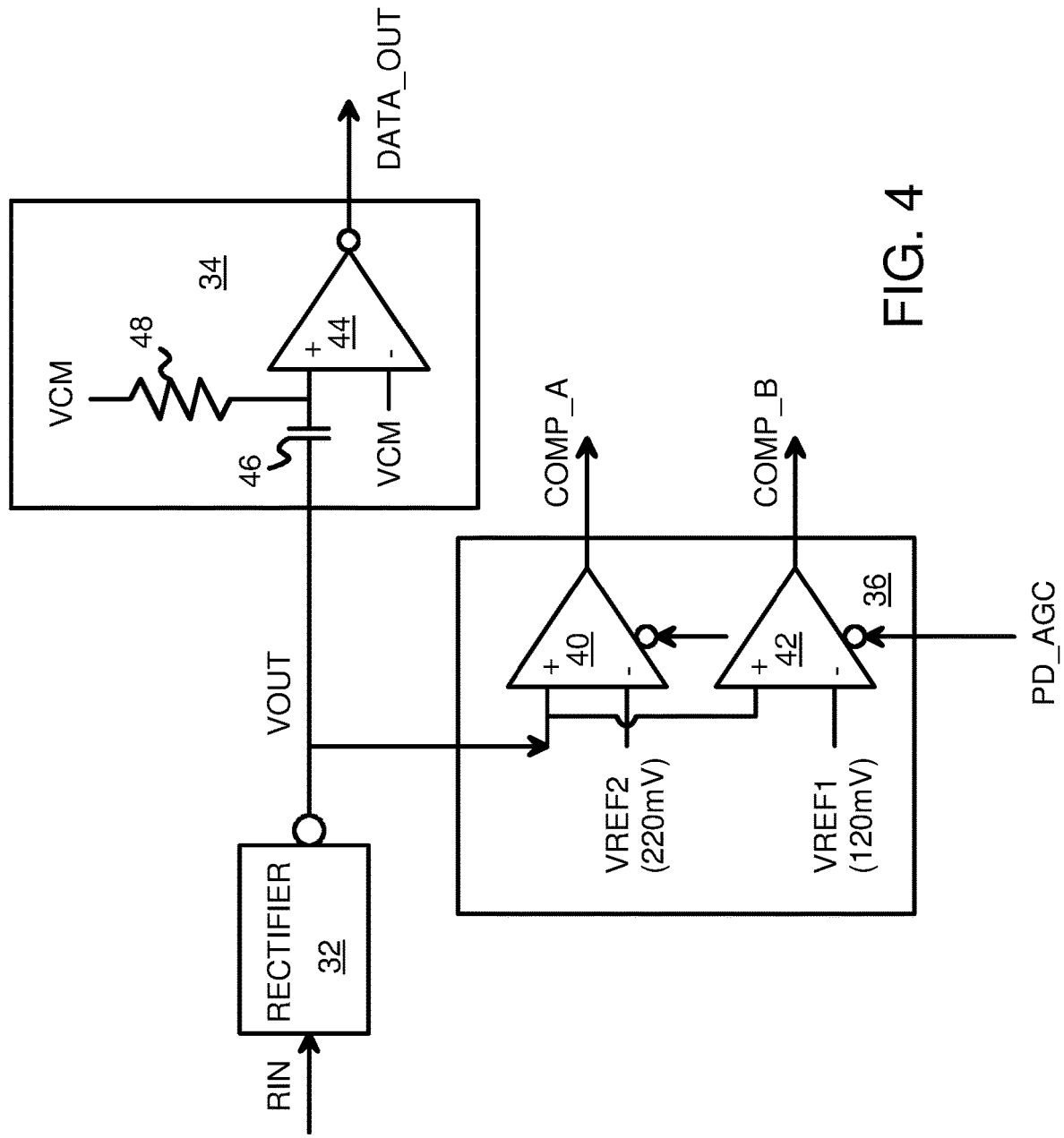
FIG. 4 highlights voltage comparison for gain setting.

FIG. 4 highlights voltage comparison for gain setting. Rectifier 32 is inverting and outputs voltage VOUT low when RIN is high, which is sensed by decision circuit 34 to generate the output data DATA_OUT that is then parsed by frame logic (not shown) to extract the data payload. Capacitor 46 can pass high-frequency signals while isolating D.C levels from decision circuit 34. Resistor 48 biases the non-inverting + input of comparator 44 to a common-mode voltage VCM, allowing the small-signal data to pass through capacitor 46 and onto the + input of comparator 44. The inverting − input of comparator 44 is connected directly to VCM. Comparator 44 is inverting so that DATA_OUT is high when VOUT is low to compensate for the inversion by rectifier 32.

VOUT from rectifier 32 is also input to level detector 36, where VOUT is applied to the non-inverting + inputs of comparators 40, 42. Two different voltage references are applied to the inverting − inputs of comparators 40, 42. The inverting − input of comparator 40 receives VREF2 while the inverting − input of comparator 42 receives a lower reference voltage VREF1. For example, VREF1 can be 120 mV while VREF2 can be 220 mV, as one of many possible examples.

Upper comparator 40 drives its output, COMP_A, high when VOUT is greater than VREF2, while lower comparator 42 drives its COMP_B output high when VOUT is greater than VREF1. There are three possible combinations of COMP_A, COMP_B: 11 when VOUT is > VREF2 and > VREF1, 01 when VOUT is between VREF2 and VREF1, and 00 when VOUT is below both VREF1 and VREF2.

In this embodiment, rectifier 32 is inverting. When the carrier is received and amplified, rectifier input RIN is high, causing rectifier 32 to drive its output VOUT low. When no carrier is received, rectifier input RIN is low, causing rectifier 32 to drive its output VOUT high. Thus rectifier 32 has a logical inversion in this embodiment.

Comparators 40, 42 are powered down when PD_AGC is high. When powered down, comparators 40, 42 drive COMP_A and COMP_B low. Power is conserved by driving PD_AGC high after AGC has completed setting the gain at the start of each frame, since comparators 40, 42 are not switching as data in the data payload and other frame fields are received.

Figure 5:
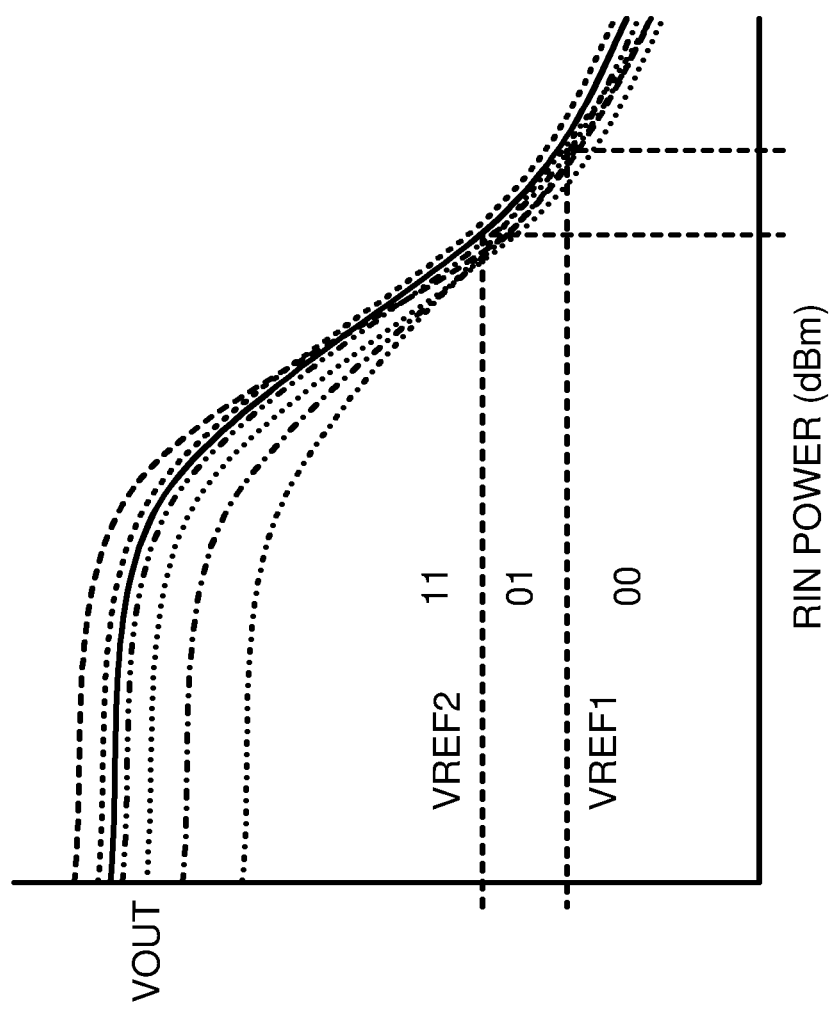
FIG. 5 is a graph of rectifier output voltage as a function of rectifier input power.

FIG. 5 is a graph of rectifier output voltage as a function of rectifier input power. In FIG. 5, the voltage output VOUT from rectifier 32 is plotted as a function of the input power to rectifier 32 on input RIN. In this embodiment, as shown in FIG. 4, rectifier 32 is inverting, so when no carrier is received and RIN has low power, VOUT is high, as shown on the left of the graph of FIG. 5. When the carrier is received, such as for a data 1, RIN is high power, and rectifier 32 drives VOUT low, as shown on the right of the graph of FIG. 5.

Each curve in FIG. 5 is for a different combination of fast or slow or typical devices, for different temperatures. These operating curves can be generated by simulation with different device or process parameters and temperatures of operation. The target values of voltage references VREF1, VREF2 in level detector 36 can be determined based on the operation of rectifier 32 as shown in the graph of FIG. 5.

The system design may have a target for the rectifier input power, such as −6 dBm to −2 dBm, which determines the vertical dashed lines rising from the x-axis. Horizontal dashed lines are drawn from where the vertical lines intersect the middle of the bundle of operating curves. These horizontal dashed lines intersect the y-axis at the target threshold voltages, or VREF2 and VREF1.

For low input power and low voltages of RIN, such as when no carrier is received for a data 0, rectifier 32 drives VOUT high. When VOUT output by rectifier 32 is greater than both VREF1 and VREF2, then COMP_B, COMP_A are 11.

When a carrier is received, such as for a data 1, high input power and voltage are input to rectifier 32, which drives VOUT low. When VOUT output by rectifier 32 is less than both VREF1 and VREF2, then COMP_B, COMP_A are 00.

For intermediate voltages, when VOUT is between VREF1 and VREF2, COMP_B, COMP_A are 01.

AGC controller 30 iteratively reduces the gain settings starting from a maximum gain value, which may cause saturation and high RIN power that causes rectifier 32 to drive VOUT to very low voltages. When VOUT is very low, COMP_B, COMP_A are 00.

As the gain settings are reduced, the input power to RIN is also reduced, causing VOUT to rise. Eventually VOUT rises above the lower threshold VREF1, and COMP_B becomes 1 while COMP_A remains 0. This 01 condition detected by level detector 36 causes AGC controller 30 to stop adjusting the gain settings and lock these gain settings for the remainder of the current frame. Once AGC controller 30 has finished gain adjustment, VOUT should be between the horizontal dashed lines in FIG. 5 for data 1's. The input power to rectifier 32 should be between the vertical dashed lines, which is the target input power to rectifier 32.

Figure 6:
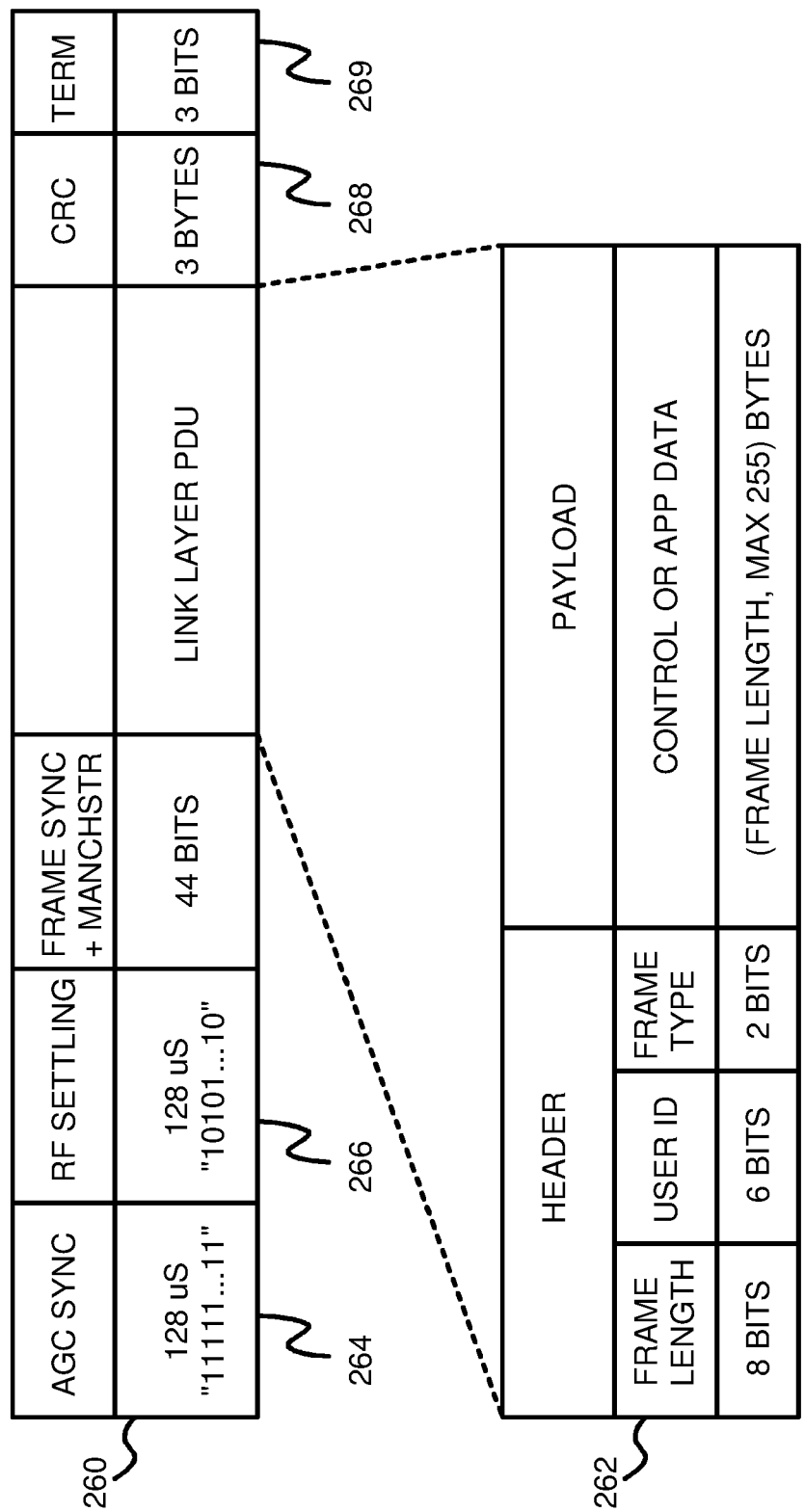
FIG. 6 shows an OOK frame.

FIG. 6 shows an OOK frame. OOK frame 260 uses On-Off Shift Keying (OOK) where 1's are generated by sending the carrier while 0's are generated as the absence of the carrier. Between frames no carrier is transmitted, which is received as a string of 0's. OOK frame 260 begins with AGC sync 264, where the carrier is transmitted continuously for 128 uS, which is received as a continuous string of 1's. AGC controller 30 operates during AGC sync 264 and locks the gain setting by the end of AGC sync 264. Then the gain setting remains constant for the remainder of OOK frame 260.

AGC sync 264 is followed by a series of alternating 1's and 0's in RF settling field 266, which is also 128 uS. Then a frame sync and Manchester field of 44 bits follows. Link layer PDU 262 follows, which has a header and a payload. The header can have an 8-bit frame length field, a 6-bit user ID, and a 2-bit frame type. The payload can be up to 255 bytes, and can carry application data or control information. Cyclical Redundancy Checking (CRC) field 268 of 3 bytes follows the payload, while a 3-bit termination field ends OOK frame 260. No carrier is transmitted between frames, so a long period of 0's occur between frames before the next frame starts with a series of 1's in AGC sync 264.

The length of AGC sync 264 can be large enough to allow all possible gain settings to be tested by AGC controller 30. For example, if there are 3 binary bits for the gain setting for each of LNA 20, low pass filter 22, and PGA 24, and 7 settings per level, then a total of 7*3 or 21 settings may need to be tested, worst case. If 5 uS is required for settling after each gain-setting adjustment, then 5 uS*21=105 uS may be needed for AGC controller 30 to test all possible gain settings. So a 128 uS time for AGC sync 264 is sufficient.

Figure 7:
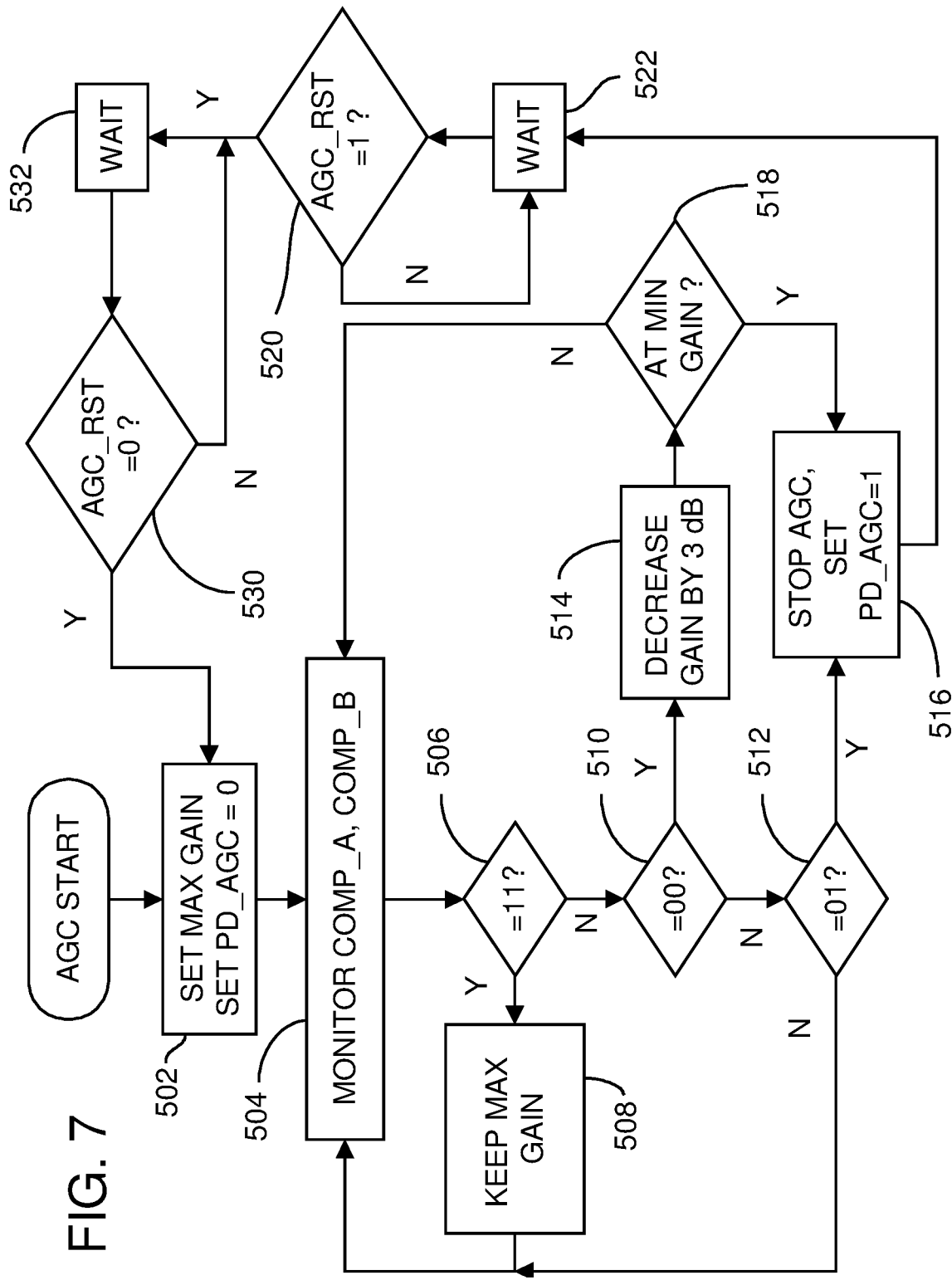
FIG. 7 is a flowchart of operation of the AGC controller.

FIG. 7 is a flowchart of operation of the AGC controller. When AGC controller 30 is initialized, such as after power on or reset, the gain settings are set to the maximum setting, step 502. A power-down AGC parameter, PD_AGC, is set to 0 to enable level detector 36 to generate COMP_A and COMP_B to enable AGC controller 30 to adjust the gain settings. AGC controller 30 monitors compare results COMP_A, COMP_B from level detector 36, step 504. When VOUT is greater than both VREF2, VREF1, then COMP_A, COMP_B is 11, step 506. The max gain setting is retained, step 508.

The 11 condition occurs when no carrier is received just before the start of a new frame. When the new frame starts, the carrier is continuously received during AGC sync 264. The continuous carrier and the maximum gain setting causes a high power to be applied to RIN input to rectifier 32, which drives VOUT very low.

When VOUT is less than both VREF2, VREF1, then COMP_A, COMP_B is 00, step 510. The gain setting is reduced by one step, such as 3 dB, step 514. When the new gain setting is not the minimum gain setting, step 518, then monitoring continues, step 504, such as after a settling delay of 5 uS.

With each loop through steps 504, 510, 514, the gain decreases and VOUT rises. After enough gain decreases have occurred, VOUT has risen to be between VREF2, VREF1. Then COMP_A, COMP_B is 01, step 512. The target gain has been reached. Gain adjustment stops, and PD_AGC is set to 1 to power down level detector 36 and end the gain-searching procedure executed by AGC controller 30, step 516. Gain adjustment also ends when the minimum gain setting is reached, step 518.

After waiting for a period of time, step 522, such as one period of a 38.4 MHz clock, AGC_RST is checked, step 520. Waiting continues, step 522, when AGC_RST is not yet set. step 520, When the end of the current frame is reached, frame detector 35 pulses AGC_RST high. Step 520 detects the rising edge of AGC_RST, while step 530 detects the falling edge of AGC_RST. When the AGC_RST pulse is high, wait step 532 loops with step 530 until the pulse ends after a period of time. Then AGC controller 30 is reset to the maximum gain setting and PD_AGC is set to 0 to power up level detector 36 and re-enable AGC controller 30 for the next frame, step 502.

After the AGC_RST pulse ends, and before AGC sync 264 (FIG. 6) starts, the data remains 0's as no carrier is transmitted. COMP_A and COMP_B are 11 before the frame starts, since VOUT is high due to the inversion in rectifier 32.

Once the next frame starts and AGC sync 264 begins, the carrier is transmitted continuously and 1's are received. VOUT drops. Level detector 36 can operate normally to allow step 504 to monitor COMP_A, COMP_B.

When PD_AGC is set in step 516, the final gain setting is locked and stored. The gain setting can have 3 parts: a gain setting for LNA 20, a gain setting for low pass filter 22, and a gain setting for PGA 24. This gain setting is used to set the gain of LNA 20, low pass filter 22, and PGA 24 for the remainder of the current frame.

Figure 8:
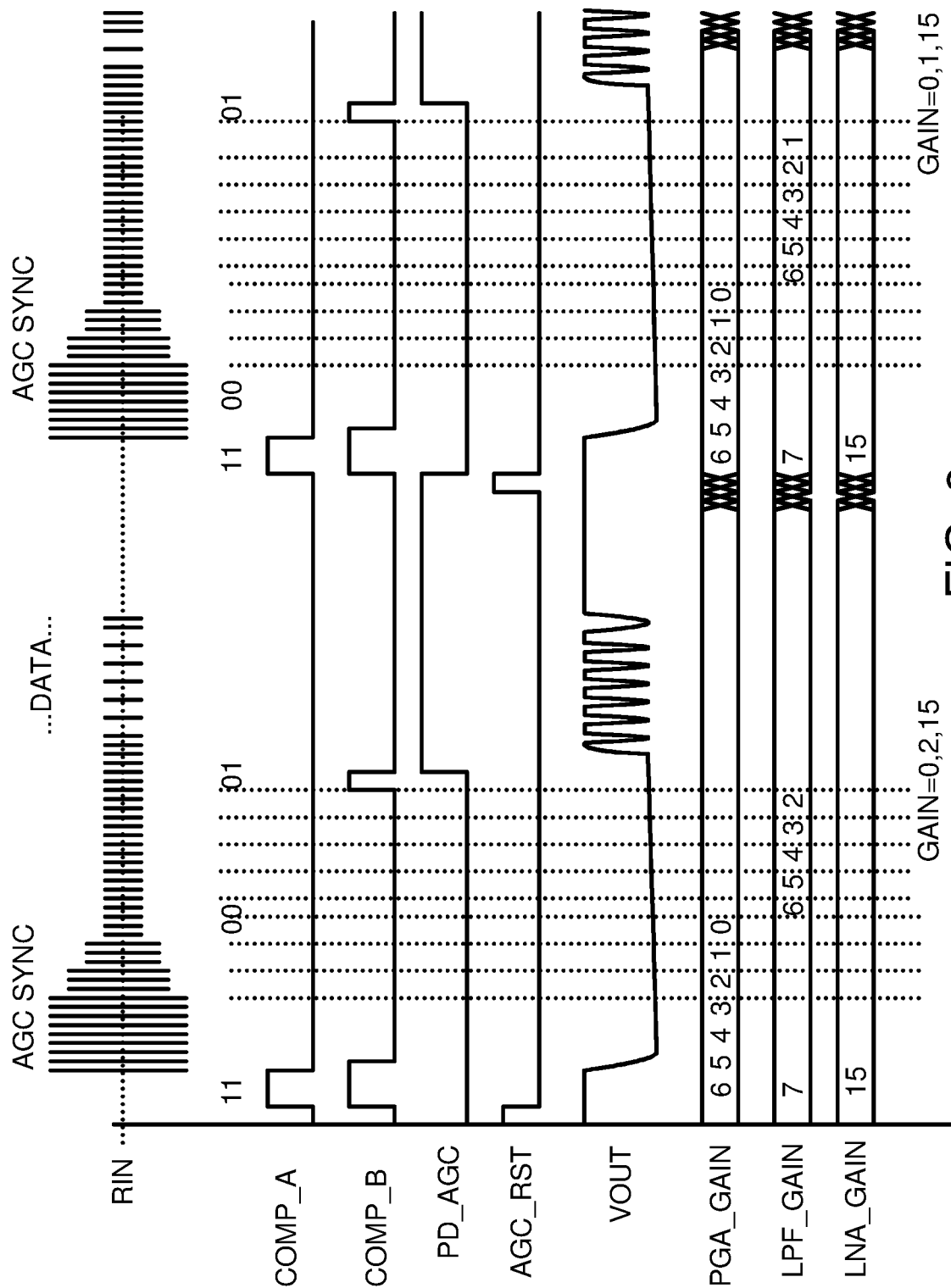
FIG. 8 is a waveform diagram of operation of the OOK receiver with AGC setting at the beginning of each frame.

FIG. 8 is a waveform diagram of operation of the OOK receiver with AGC setting at the beginning of each frame. For OOK modulation, the rectifier input RIN to rectifier 32 (FIG. 3) is null between frames since no carrier is transmitted. At the beginning of each frame, the carrier is continuously sent during AGC sync 264. Later in the data payload part of the frame, the carrier is sent for signaling data 1's and not sent for 0's.

The amplitude of rectifier input RIN (FIG. 3) is initially high as the maximum gain setting is used, but then this RIN amplitude is stepped down and decreases as the gain setting is reduced in steps as each loop in the AGC process of FIG. 7 is executed. Once the AGC process ends, the gain setting is locked and the amplitude of RIN for data 1's remains the same for the rest of the current frame. In FIG. 8 the data payload and other fields in OOK frame 260 are not drawn to scale along the x-axis (time), but AGC sync 264 is enlarged relative to other parts of OOK frame 260.

AGC_RST is pulsed high by frame detector 35 at the end of each frame when no carrier is transmitted for a long period of time. COMP_A and COMP_B are both low when PD_AGC is high to disable comparators 40, 42 (FIG. 4). Once PD_AGC is low and the AGC_RST reset pulse ends, level detector 36 can compare VOUT to the voltage thresholds to generate COMP_A, COMP_B, which are high (11) between frames since VOUT is high when no carrier is transmitted.

The gain settings are initialized to their maximums. The gain settings have 3 components. PGA_GAIN is set to a maximum of 6 for PGA 24. LPF_GAIN is set to a maximum of 7 for low pass filter 22, and LNA_GAIN is set to its maximum of 15 for setting the gain of LNA 20.

When the frame begins, the continuous carrier in AGC sync 264 and the maximum gain settings cause large amplitude swings of RIN. The inversion in rectifier 32 causes VOUT to drop to a low value below VREF1 and VREF2. COMP_A, COMP_B switch to 00.

AGC controller 30 reduces the gain by 3 dB (Step 514, FIG. 7) for each loop, as PGA_GAIN drops from 6 to 5 to 4 to 3 to 2 to 1 and then to 0 over the next 6 loops. LPF_GAIN and LNA_GAIN are kept at their maximums of 7 and 15. The amplitude of RIN steps down as PGA_GAIN is stepped down and VOUT gradually rises.

After PGA_GAIN reaches its minimum setting of 0, then AGC controller 30 steps LPF_GAIN down from 7 to 6, then 5, 4, 3, and finally 2, when COMP_B goes to 1 as VOUT rises above the lower voltage threshold VREF1. PD_AGC is set high by AGC controller 30 to end AGC gain adjustment, powering down level detector 36 which causes COMP_A, COMP_B to go low and remain low for the data payload and other parts of the current frame.

The final gain settings of PGA_GAIN=0, LPF_GAIN=2, and LNA_GAIN=15 are locked and used for the remainder of the current frame. After AGC sync 264 ends, 0's as well as 1's are transmitted for other fields in the current frame, such as for the data payload. No carrier is sent for 0's, so RIN has null or zero-amplitude signals for these 0's. VOUT goes high when no carrier is received for data 0's, and VOUT goes low when the carrier is received for data 1's.

Eventually the first frame ends, and no carrier is sent between frames, causing VOUT to remain high. Frame detector 35 detects the long period with no carrier and pulses AGC_RST high. This resets the gain settings to their maximum settings of 6, 7, 15. Also PD_AGC goes low to enable level detector 36 to generate COMP_A, COMP_B, which are 11 since VOUT remains high while no carrier is received. Then as the carrier begins to be sent continuously for AGC sync 264 at the start of the second frame, VOUT drops and COMP_A, COMP_B fall to 00.

AGC controller 30 reduces the gain by 3 dB for each loop, as PGA_GAIN drops from 6 to 5 to 4 to 3 to 2 to 1 and then to 0 over the next 6 loops. LPF_GAIN and LNA_GAIN are kept at their maximums of 7 and 15. The amplitude of RIN steps down as PGA_GAIN is stepped down and VOUT gradually rises.

After PGA_GAIN reaches its minimum setting of 0, then AGC controller 30 steps LPF_GAIN down from 7 to 6, then 5, 4, 3, 2, and finally 1, when COMP_B goes to 1 as VOUT rises above the lower voltage threshold VREF1. PD_AGC is set high by AGC controller 30 to end AGC gain adjustment. PD_AGC also disables level detector 36 which causes COMP_A, COMP_B to go low. VOUT rises for 0 data and falls for 1 data.

The final gain settings of PGA_GAIN=0, LPF_GAIN=1, and LNA_GAIN=15 are locked and used for the remainder of the second frame. Each subsequent frame will have its gain set in a similar manner. As the circuit warms AGC controller 30 will adjust the gain setting to compensate for temperature or any other drifts, such as received power changes due to changes in the distance or orientation to the transmitter or atmospheric conditions.

ALTERNATE EMBODIMENTS

Several other embodiments are contemplated by the inventors. For example many combinations, integrations, and variations of decision circuit 34, level detector 36, rectifier 32, AGC controller 30, amplifiers, filters, and other components are possible. Inversions may be added or removed, such as by swapping inverting and non-inverting inputs on comparators or adding inverter stages. While an inverting rectifier 32 has been described, a non-inverting rectifier 32 that drives VOUT low for data 0's and high for data 1's could also be used. decision circuit 34 could be a comparator, an Analog-to-Digital Converter (ADC). Rather than compare voltages, currents could be compared.

The mixer and local oscillator could be deleted when the received signal has a lower frequency than Radio-Frequency (RF).

Each gain setting may adjust the power gain by 3 dB, or by some other value. For example, PGA 24 may have a gain that is adjustable in 3 dB steps between 18 dB and 0 dB. LNA 20 may have a gain that is also adjustable in 3 dB steps, but from 38 dB to 17 dB. Each block's gain could be set in software or by a programmable register, and this software setting could override the gain set by AGC controller 30.

The gain settings for LNA 20, low pass filter 22, and PGA 24 do not have to be equal or linear. There may be more possible gain settings for PGA 24 than for LNA 20 as one example. The overall gain that is the combination of the gains of LNA 20, low pass filter 22, and PGA 24 can be 20-80 dBm as an example. The input power can range from −70 dBm to −20 dBm as one example.

Stepping down the gain of PGA 24 first, and LNA 20 last allows for LNA 20 to operate at the maximum gain possible, which is useful for amplifying weak RF signals input to LNA 20. Other sequences could be substituted, such as adjusting gains of both PGA 24 and low pass filter 22 at the same time, rather than adjusting the gain of PGA 24 before any adjustment to the gain of low pass filter 22. Low pass filter 22 can be an active RC filter with a variable gain. Also, the gain of low pass filter 22 could be fixed, such as when a passive filter is used rather than an active filter.

Many frame, header, and payload structures may be substituted, and many variations and extensions are possible. Variable-length payloads are possible. The order, sequence, and arrangement of the steps in FIG. 7 may be adjusted in many different ways for various purposes. The waveform of FIG. 8 may likewise vary for different specific embodiments and circuit and procedure variations.

While On-Off Shift Keying (OOK) has been described, and benefits greatly from the invention, other modulation schemes could be substituted, such as Amplitude Shift Keying (ASK) and still benefit from the invention. Rather than set the gain for each frame, AGC controller 30 could operate less frequently, such as for a subset of frames, such as for every 5$^{th}$ frame, or for the next frame after a timer elapses.

Some receivers may have additional or fewer components, or may merge components, such as having low pass filter 22 integrated with PGA 24. LNA 20 could have a fixed rather than a variable gain, and only the gain of PGA 24 be adjusted if low pass filter 22 was passive and had a fixed gain. Some embodiments may delete PD_AGC and not power down comparators 40, 42 in level detector 36, or may gate off COMP_A, COMP_B rather than power down the comparators generating them.

More complex buffers, level shifters, comparators, or other components could be substituted or added. Inversions could be added at various locations. Hysteresis of other delays and output wave shaping could be added.

Different transistor, capacitor, resistor, and other device sizes can be used, and various layout arrangements can be used, such as multi-leg, ring, doughnut or irregular-shape transistors. Currents can be positive or negative currents and flow in either direction. Many second and third order circuit effects may be present and may be significant, especially for smaller device sizes. A circuit simulation may be used to account for these secondary factors during design.

Devices may be implemented using n-channel, p-channel, or bipolar transistors, or junctions within these transistors. The gate lengths and spacings can be increased to provide better protection from damage. A Complementary Metal-Oxide-Semiconductor (CMOS), biCMOS, or bipolar process may be used for amplifiers such as LNA 20 and PGA 24, and for rectifier 32.

Many variations of IC semiconductor manufacturing processes are possible. Various materials may be used.

Terms such as up, down, above, under, horizontal, vertical, inside, outside, upper, lower, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A receiver with non-continuous Automatic Gain Control (AGC) comprising:
    a front end having a Low-Noise Amplifier (LNA), a Low-Pass Filter (LPF), and a Programmable Gain Amplifier (PGA) in series to amplify a received signal applied to an input of the LNA to generate an amplified output, wherein a gain of the front end is adjustable in response to a gain setting;
    a rectifier that rectifies the amplified output from the front end to generate an output voltage;
    a data converter that receives the output voltage from the rectifier and generates binary data;
    a frame detector that receives the binary data from the data converter and activates a framing signal that is synchronized to frames of the binary data;
    a level detector that compares the output voltage from the rectifier to a first threshold to generate a first compare result and to a second threshold to generate a second compare result, wherein the second threshold is greater than the first threshold; and
    an AGC controller that is activated for a new frame by the framing signal from the frame detector, the AGC controller initializing the gain setting to a maximum gain in response to the framing signal, the AGC controller decreasing the gain setting in response to the first compare result and the second compare result, the AGC controller locking the gain setting when the first compare result and the second compare result indicate that the output voltage is between the first threshold and the second threshold,
    whereby the gain setting is adjusted in response to the framing signal and locked until the AGC controller is activated again for a next new frame.

2. The receiver of claim 1 wherein the AGC controller locks the gain setting at a start of a frame before a data payload in the frame, wherein the gain setting does not change during the data payload and only changes at the start of the frame.

3. The receiver of claim 2 wherein the frame is an On-Off Shift Keying (OOK) modulated frame, wherein a carrier is transmitted to signal a data 1 wherein and no carrier is transmitted to signal a data 0.

4. The receiver of claim 3 wherein the frame further comprises a AGC sync field, wherein the carrier is continuously present in the received signal during the AGC sync field, wherein the carrier is not present in the received signal between frames;
    wherein within the frame the AGC sync field is received before a data payload is received, the data payload having time periods when the carrier is present when a data 1 is signaled, and time periods when the carrier is not present when a data 0 is signaled;

wherein the gain setting is adjusted when the AGC sync field is received;

wherein the gain setting is not changed and remains locked when the data payload is received;

whereby Automatic Gain Control (AGC) is performed during the AGC sync field, before the data payload in the frame is received.

5. The receiver of claim 3 wherein the gain setting further comprises a PGA gain setting that sets a gain of the PGA, and a LNA gain setting that sets a gain of the LNA;

wherein the AGC controller reduces the PGA gain setting to a minimum value before reducing the LNA gain setting from a maximum value, wherein the LNA operates with a largest possible gain by reducing the gain of the PGA before reducing the gain of the LNA.

6. The receiver of claim 3 wherein the gain setting further comprises a PGA gain setting that sets a gain of the PGA, a LPF gain setting that sets a gain of the LPF, and a LNA gain setting that sets a gain of the LNA;

wherein the AGC controller reduces the PGA gain setting to a minimum value before reducing the LNA gain setting from a maximum value;

wherein the AGC controller reduces the LPF gain setting to a minimum value before reducing the LNA gain setting from a maximum value, wherein the LNA operates with a largest possible gain by reducing the gain of the PGA and reducing the gain of the LPF before reducing the gain of the LNA.

7. The receiver of claim 6 wherein the front end further comprises:

a local oscillator that generates a local clock having a lower frequency that a frequency of the carrier of the received signal;

a mixer that mixes an output of the LNA with the local clock from the local oscillator to generate an input to the LPF;

wherein an output of the LPF drives an input of the PGA, the PGA generating the amplified output to the rectifier.

8. The receiver of claim 6 wherein the frame detector activates the framing signal between frames when no carrier is received on the received signal.

9. The receiver of claim 8 further comprising:

a power-down signal that is activated by the AGC controller when the gain setting is locked, wherein the power-down signal is de-activated by the framing signal from the frame detector.

10. The receiver of claim 9 wherein the power-down signal from the AGC controller is applied to the level detector, the power-down signal causing the level detector to disable comparing the output voltage when the gain setting is locked.

11. The receiver of claim 10 wherein the level detector further comprises:

a first comparator that compares the output voltage to the first threshold to generate the first compare result, the first comparator disabled by the power-down signal when the gain setting is locked;

a second comparator that compares the output voltage to the second threshold to generate the second compare result, the second comparator disabled by the power-down signal when the gain setting is locked.

\* \* \* \* \*